US008170849B2

(12) United States Patent
Schick et al.

(10) Patent No.: US 8,170,849 B2
(45) Date of Patent: May 1, 2012

(54) SPRAY NOZZLE CONFIGURATION AND MODELING SYSTEM

(75) Inventors: Rudolf J. Schick, Forest Park, IL (US); Keith L. Cronce, Lockport, IL (US); Wojciech Kalata, Wood Dale, IL (US)

(73) Assignee: Spraying Systems Co., Wheaton, IL (US)

( * ) Notice: Subject to any disclaimer, the term of this patent is extended or adjusted under 35 U.S.C. 154(b) by 700 days.

(21) Appl. No.: 12/269,820

(22) Filed: Nov. 12, 2008

(65) Prior Publication Data

US 2010/0121616 A1 May 13, 2010

(51) Int. Cl.
*G06F 9/455* (2006.01)

(52) U.S. Cl. ........................................... 703/6; 239/726

(58) Field of Classification Search .................. 703/2, 7, 703/6; 73/861.18, 64.53; 134/18; 239/146, 239/526, 1, 223, 296, 726; 175/57; 702/182; 717/108

See application file for complete search history.

(56) References Cited

U.S. PATENT DOCUMENTS 4,357,900 A 11/1982 Busch
5,704,546 A * 1/1998 Henderson et al. ............... 239/1
7,185,960 B2 3/2007 Farr
2002/0005439 A1* 1/2002 Kendall ........................ 239/223
2002/0062788 A1 5/2002 Czech et al.
2006/0036417 A1 2/2006 Wu et al.
2006/0106574 A1* 5/2006 Asakawa ...................... 702/182
2006/0225489 A1* 10/2006 Giles et al. ................... 73/64.53
2006/0253835 A1* 11/2006 Saelens ......................... 717/108
2006/0273189 A1* 12/2006 Grimm et al. ................. 239/146
2008/0017734 A1* 1/2008 Micheli et al. ................ 239/296
2008/0307893 A1* 12/2008 Giles .......................... 73/861.18
2009/0020334 A1* 1/2009 Gavia ............................. 175/57
2009/0211605 A1* 8/2009 Ahmad ........................... 134/18
2009/0230218 A1* 9/2009 Drozd ........................... 239/526
2009/0277976 A1* 11/2009 Micheli et al. ................ 239/526

FOREIGN PATENT DOCUMENTS

WO WO 11/2009
PCT/US2009/063867

OTHER PUBLICATIONS

U.S. Appl. No. 12/572,967, filed Nov. 12, 2008, Schick.
International Search Report and Written Opinion for PCT/US2009/063867 dated Jan. 8, 2010.
Schick et al., "Characterization of Two Fluid Spray Nozzle for $NO_x$ Control Applications," http://service.spray/cp,/lit/lyt_;ost_sa_asp and http://www.netl.doe.gov/publications/proceedings/03/scr-snr-sncr/scr-sncr03.html (date uncertain, possibly Oct. 2003) (7 pages).

* cited by examiner

*Primary Examiner* — Kandasamy Thangavelu
(74) *Attorney, Agent, or Firm* — Leydig, Voit & Mayer, Ltd.

(57) ABSTRACT

A spray injection analysis and nozzle configuration system is described having a user input unit that collects spray system input parameters and relays the collected parameters to a fluid performance matching unit and/or problem geometry unit for subsequent processing. The user inputs basic system parameters, including the desired spray fluid characteristics, to obtain suggested system configuration, including spray nozzle types and quantities. Accuracy of suggested spray nozzle type and configuration is increased via approximating the viscosity and/or surface tension parameters of the desired spray fluid with that of collected performance data. When a user already knows the desired spray nozzle type and associated system parameters, the user input unit routes this information to the problem geometry unit for creation of a problem geometry file, including calculation of the drop size distribution and spray velocity, and performance modeling via the fluid modeling unit.

14 Claims, 12 Drawing Sheets

SPRAY NOZZLE CONFIGURATION AND MODELING SYSTEM

FIELD OF THE INVENTION

This invention relates generally to the field of spray nozzle performance optimization and more specifically to the field of automated spray parameter and spray nozzle selection.

BACKGROUND OF THE INVENTION

Spray nozzle applications range from material coating to liquid cooling using various spray media and numerous nozzle configurations in order to match the specific needs of a given application. The broad spectrum of spray nozzle applications necessitates a careful analysis of spray injection parameters to come up with an optimum spray nozzle design, as well as to match an appropriate spray nozzle to a desired application.

Flow modeling software applications, such as FLUENT, employ a Discrete Phase Model (DPM), which may be used for modeling of spray nozzle characteristics. However, such modeling software requires users to have the knowledge of complicated spray injection parameters to match the spray nozzle under analysis. Spray injection parameters necessary for modeling spray flow characteristics include drop size distribution, spray velocity, and flow rate at given pressure.

These parameters must be separately obtained and computed prior to any spray modeling. For instance, in order to supply spray injection parameters to the modeling software, all data has to be gathered and drop size distribution has to be calculated multiple times, for example based on Rosin-Rammler distribution from $D_{V0.5}$ or $D_{32}$ data sheets.

Additionally, proper nozzle selection requires a number of parameters that a user is not likely to know during the spray system design and specification stage. Prior methods of estimating nozzle configuration were limited in their accuracy due to their lack of ability to take into account fluid characteristics that affect spray angle, such as viscosity and surface tension.

BRIEF SUMMARY OF THE INVENTION

Therefore, it is an object of the invention to automatically suggest a spray nozzle and its running conditions, whereby spray performance of a user specified system is accurately approximated via matching of fluid characteristics, including viscosity and surface tension, with test data including associated spray nozzle performance.

It is another object of the invention to automatically supply and calculate spray injection parameters for spray modeling based on user input. It is also another object of the invention to perform initial spray cooling design in connection with supplying the spray injection parameters to a spray modeling application.

Embodiments of the invention are used to provide a spray injection analysis and nozzle configuration system having a user input unit that collects spray system input parameters and relays the collected parameters to a fluid performance matching unit and/or problem geometry unit for subsequent processing. The user input module allows a user to input basic system parameters, including the desired spray fluid characteristics, to obtain suggested system configuration, including spray nozzle types and quantities, from the fluid performance matching unit. Alternatively, when a user already knows the desired spray nozzle type and associated system parameters, the user input unit receives such information from the user and routes these parameters to the problem geometry unit for performance modeling via the fluid modeling unit. Preferably, the user input unit presents a Graphical User Interface (GUI) to the user for collecting the spray system input parameters and displaying results of the processing.

When a user desires to identify a spray nozzle configuration for coating flat materials or products traveling on a conveyor, for example, the spray system input parameters comprise: spray fluid type (e.g., oil, water) and/or specific gravity of the fluid, sides of the item to be coated, surface width of each side of the item to be coated (spray width), conveyor speed, desired coating thickness, spraying distance from each side of an item to be coated, nozzle type (e.g., a hydraulic vs. an air atomizing nozzle), as well as desired nozzle properties such as nozzle material and inlet connection type and size. In response to receiving the spray system input parameters, the fluid performance matching unit matches (or approximates) spray fluid, coating, and nozzle information of the user specified system to that of collected spray performance (and/or atomizing performance) data representing various nozzle and spray fluid configurations. The fluid performance matching unit matches the user specified parameters to collected spray performance data based at least in part on viscosity and surface tension of various spray fluids. The performance matching unit 104 determines the nozzle flow rate (e.g., based on specified conveyor speed) at given pressure that corresponds to a particular spray angle associated with one or more spray nozzles. Upon receiving user input of the desired spray angle, the fluid performance matching unit returns the quantity and type of spray nozzles necessary to achieve the specified performance.

The GUI facilitates automatic creation of a problem geometry file (or a "journal file") which generates a spray injection within the fluid modeling unit. By receiving user input of a spray nozzle at certain pressure or flow condition the system looks up pressure and flow curves, available drop size data, and calculates the drop size distribution and spray velocity. The system is also flexible enough to read the geometry file so that the injection points and directions can be easily determined by usage of GUI. The system incorporates processing where initial spray cooling design may take place. The spray nozzle and its running conditions are suggested by "smart" lookup and processing throughout the database incorporated into the system.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
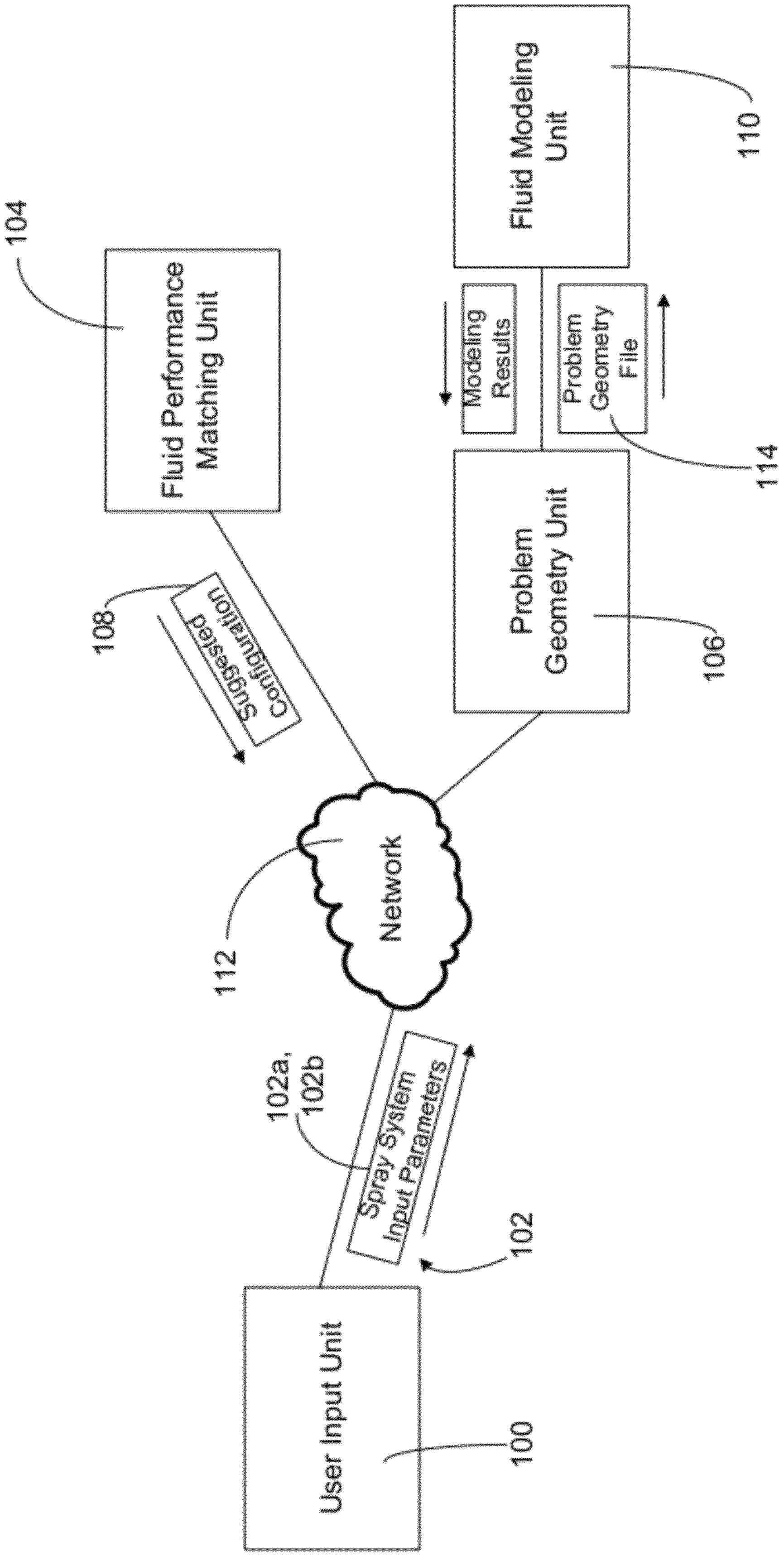
FIG. 1 is a schematic diagram illustrating a system for spray injection analysis and nozzle configuration, as contemplated by an embodiment of the present invention.

The following examples further illustrate the invention but are not intended to limit the scope of the attached claims. Turning to FIG. 1, an implementation of a system contemplated by an embodiment of the invention is shown with reference to spray injection analysis and nozzle configuration environment. To facilitate spray system configuration and spray nozzle selection, a user input unit 100 collects spray system input parameters 102 and relays the collected parameters to a fluid performance matching unit 104 and/or problem geometry unit 106 for subsequent processing. The user input module allows a user to input basic system parameters, including the desired spray fluid characteristics, to obtain suggested system configuration 108, including spray nozzle types and quantities, from the fluid performance matching unit 104.

Alternatively, when a user already knows the desired spray nozzle type and associated system parameters, the user input unit 100 may receive such information from the user and route such parameters to the problem geometry unit 106 for performance modeling based on these parameters via the fluid modeling unit 110. In one embodiment, the user input unit 100 comprises a processor, display, and computer memory for storing and executing instructions for communicating the spray system parameters 102 via a network connection 112, such as a Local Area Network (LAN) or the Internet. Preferably, the user input unit 100 presents a Graphical User Interface (GUI) to the user for collecting the spray system input parameters 102 and displaying results of the processing.

When a user desires to identify a spray nozzle configuration for coating flat materials or products traveling on a conveyor, for example, the spray system input parameters 102*a* comprise: spray fluid type (e.g., oil, water) and/or specific gravity of the fluid, sides of the item to be coated, surface width of each side of the item to be coated (spray width), conveyor speed, desired coating thickness, spraying distance from each side of an item to be coated, nozzle type (e.g., a hydraulic vs. an air atomizing nozzle), as well as desired nozzle properties such as nozzle material and inlet connection type and size. In response to receiving the spray system input parameters 102*a*, the fluid performance matching unit 104 matches (or approximates) spray fluid, coating, and nozzle information of the user specified system to that of collected spray performance (and/or atomizing performance) data representing various nozzle and spray fluid configurations. The fluid performance matching unit 104 matches the user specified parameters 102*a* to collected spray performance data based at least in part on viscosity and surface tension of various spray fluids. The performance matching unit 104 determines the nozzle flow rate (e.g., based on specified conveyor speed) at given pressure that corresponds to a particular spray angle associated with one or more spray nozzles. Upon receiving user input of the desired spray angle, the fluid performance matching unit returns the quantity and type of spray nozzles necessary to achieve the specified performance. Selection of smaller spray angles requires more nozzles to cover the specified spray area, but produces a more uniform coverage.

When a user already knows the desired spray nozzle type and associated system parameters, the user input unit 100 routes spray system input parameters 102*b* to the problem geometry unit 106 for performance modeling via the fluid modeling unit 110. In this case, spray system input parameters 102*b* comprise: nozzle type, nozzle quantity, flow rate and/or flow pressure, as well as nozzle arrangement characteristics, such as spray angle, spray distance and spray width (i.e., desired spray coverage area). The problem geometry unit 106, in turn, comprises a computer executing stored instructions for looking up pressure and flow curves, drop size data, calculating drop size distribution and spray velocity, and creating a problem geometry file 114 for the fluid modeling unit 110. The fluid modeling unit 110 reads the problem geometry file 114 and determines the injection points and directions via computational fluid dynamic (CFD) analysis. The Fluid Modeling Unit 110 comprises one or more computers executing instructions of a CFD application stored in memory. In one embodiment, the CFD application is FLUENT software available from Ansys, Inc. of 10 Cavendish Court, Lebanon, N.H. 03766.

Additionally, one skilled in the art will understand that the user input unit 100, problem geometry unit 106, and the fluid performance matching unit 104 may be implemented via multiple special-purpose computers executing computer readable instructions stored in their memory. Alternatively, the functionality of one or more units 100, 104, 106 may be combined into a single special purpose computer or other processing hardware and firmware.

Figure 2:
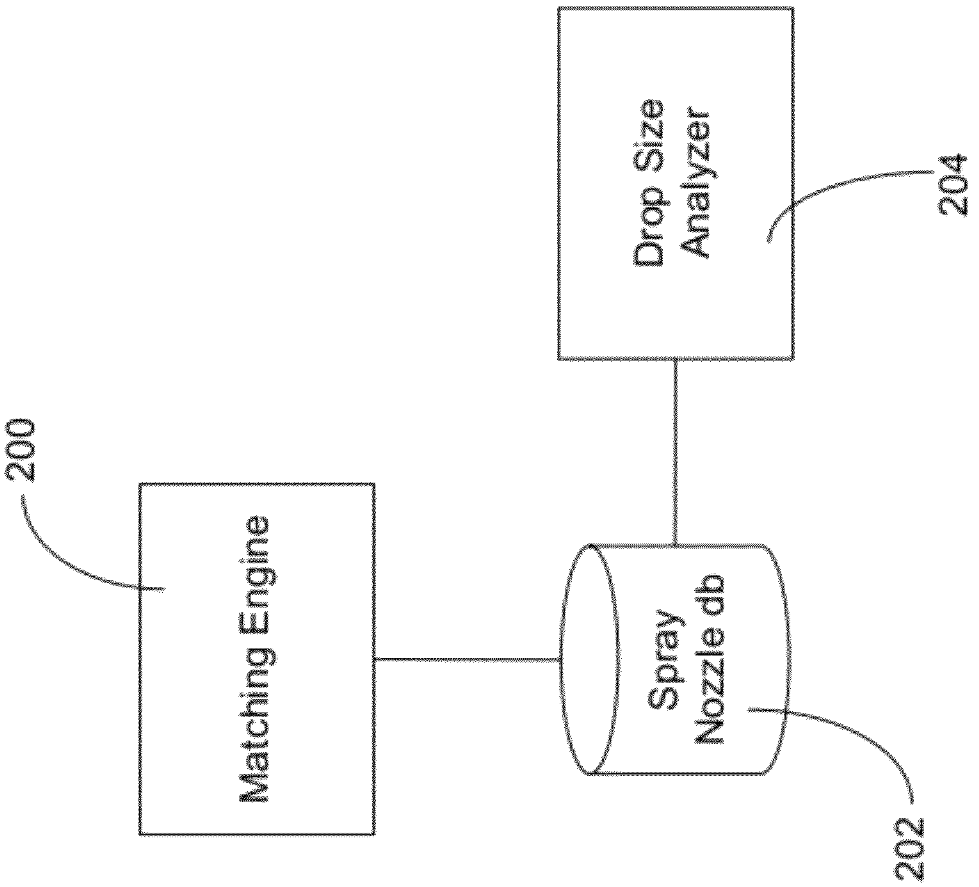
FIG. 2 is a schematic diagram of a fluid performance matching unit of FIG. 1, in accordance with an embodiment of the invention.

Turning to FIG. 2, an embodiment of the fluid performance matching unit 104 is shown in additional detail. The fluid performance matching unit 104 comprises a matching engine 200 connected to a spray nozzle database 204 that collects spray performance data from one or more drop size analyzers 204. In embodiments, the drop size analyzers 204 comprise an optical imaging analyzer, a Malvern analyzer, an optical array probe (OAP), or a phase Doppler particle analyzer (PDPA) collecting test data from various nozzle configurations and spray fluid setups. The test data collected by the nozzle database 204 includes information on various nozzle types and associated nozzle characteristics, such as nozzle type (e.g., hydraulic or air atomizing), nozzle material, inlet connection type (male, female), inlet connection size. The test data further includes fluid property information on the spray fluids used in the test nozzle setups. Specifically, the fluid property data comprises fluid viscosity and surface tension data associated with spray fluids under test. When the fluid performance matching unit 104 receives spray system input parameters 102*a* from the user input unit 100, the matching engine 200 instantiates a multidimensional matrix with user data 102*b* to match received parameters to the spray nozzle test performance data stored in the spray nozzle database 202 in order to come up with a spray nozzle setup recommendation most closely matching the user parameters. Preferably, the matching engine 200 prioritizes the matching criteria by viscosity and/or surface tension of the fluid specified by the user to most closely match the user-specified spray fluid characteristics (e.g., when an exact fluid specified by the user has not been tested). User-specified nozzle properties, coating properties, and spray surface geometry are also considered by the matching engine 200.

In order to eliminate the influence of data anomalies from test spray data stored in the spray nozzle database 202, the fluid performance matching unit 104 performs data cleanup procedures.

Figure 3:
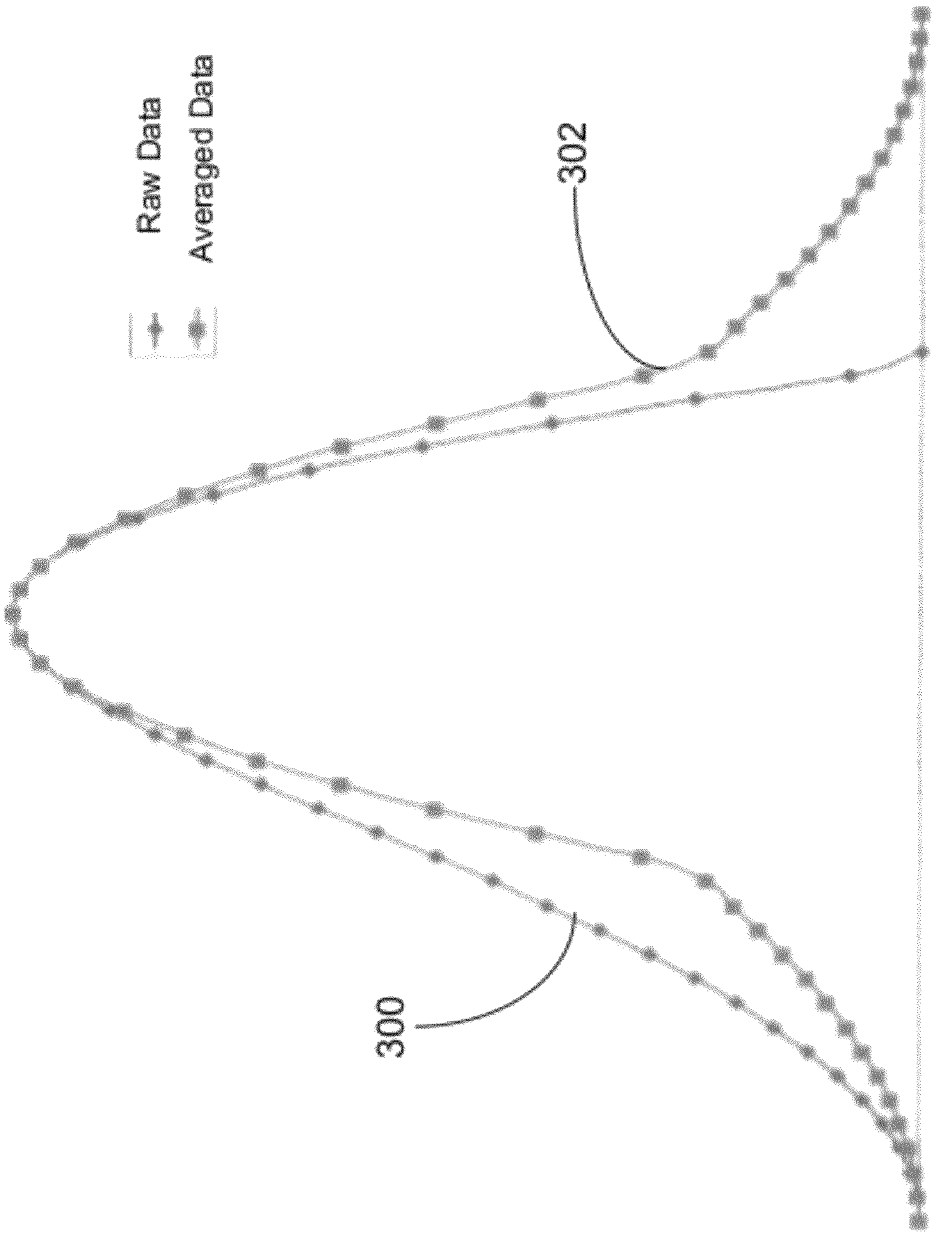
FIG. 3 is a schematic diagram of water spray distributions, in accordance with an embodiment of the invention.

Referring to FIG. 3, experimental testing of real world components introduces data noise (or data anomalies) which preferably should be eliminated from any model of the data. For the case of water distribution analysis, asymmetry in the nozzle and the experimental setup, as well as nozzle imperfections, all introduce "noise" into the data, which should be eliminated because asymmetric data nearly doubles the number of coefficients required by Fourier (trigonometric) analysis.

One possible way to address the asymmetric data is to essentially find a "mirroring" line and then average the data using data from both sides of the mirroring line. For example, consider the graph shown in FIG. 3 where the original distribution is shown by reference number 300, while distribution corresponding to the reference number 302 represents the "averaged" distribution found by "mirroring" at the $\chi$ value corresponding to the maximum $\gamma$ value.

One aspect of this method is that the width of the distribution ("coverage") using averaged data is significantly wider than the width of the distribution ("coverage") using the raw data set. One question then is "which coverage is correct" ? It also raises the question "why does this situation occur?"

Figure 4:
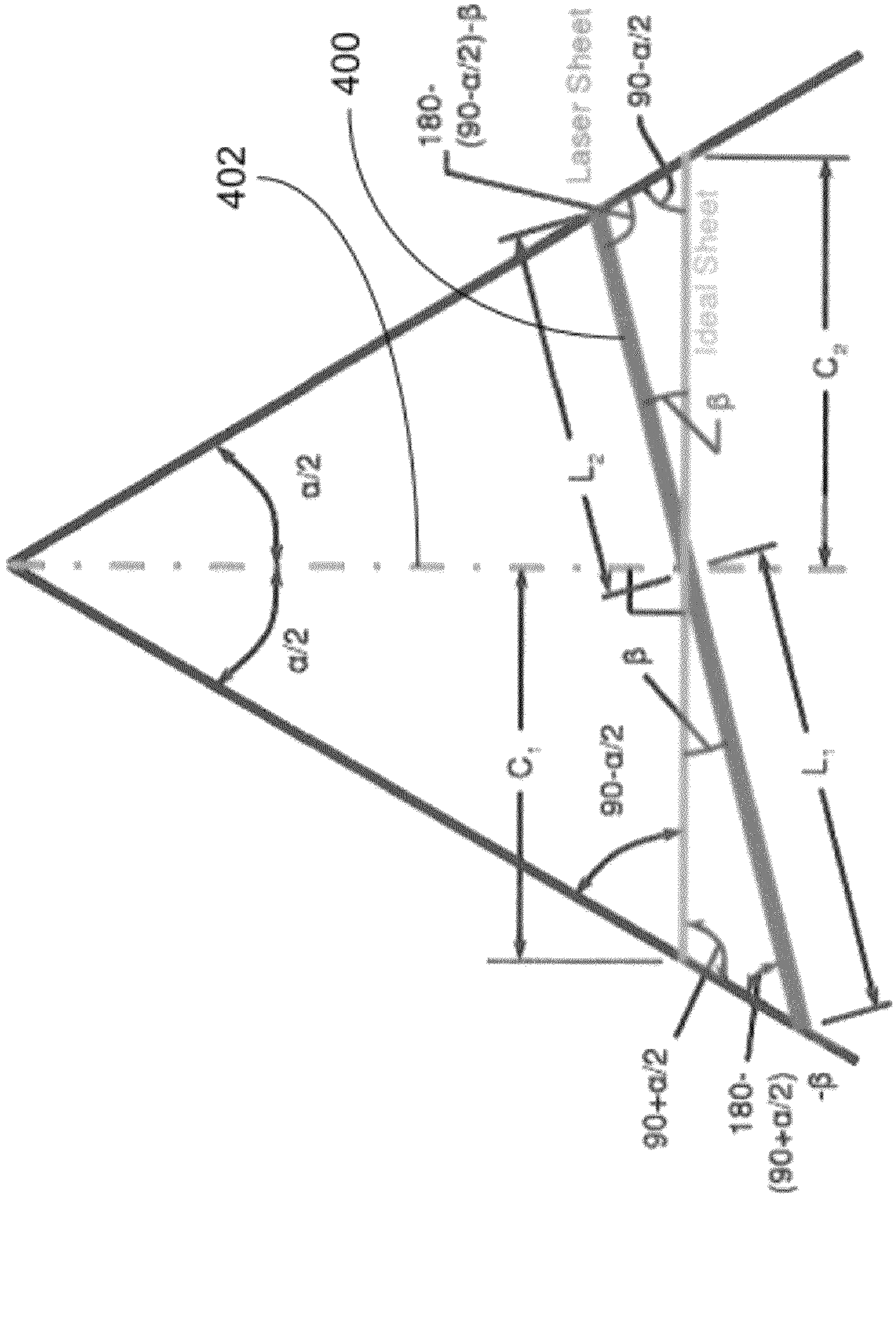
FIG. 4 is a schematic diagram of spray distribution geometry, in accordance with an embodiment of the invention.

Referring to FIG. 4, let's consider the case of the spray being offset or the laser sheet 400 not being perpendicular to the axis 402 of the nozzle. Without loss of generality, we can consider the second case.

It is seen that in this case L1>L2. The result would be a distribution similar to the one in FIG. 3. It is desirable that the effects of the $\beta$ angle are removed from the data prior to the "mirroring" operation.

To begin, we note that C1=C2.

Using the law of sines we can write $$\frac{L_1}{\sin(90+\alpha/2)} = \frac{C_1}{\sin[180-(90+\alpha/2)-\beta]} \text{ or}$$

solving for $C_1$ results in $$C_1 = \frac{L_1 \sin(90-\alpha/2-\beta)}{\sin(90+\alpha/2)}.$$

Using the same, we can also write $$\frac{L_2}{\sin(90-\alpha/2)} = \frac{C_2}{\sin[180-(90-\alpha/2)-\beta]} \text{ or}$$

solving for $C_2$ results in $$C_2 = \frac{L_2 \sin(90+\alpha/2-\beta)}{\sin(90-\alpha/2)}.$$

As $C_1=C_2$ then $$\frac{L_1 \sin(90-\alpha/2-\beta)}{\sin(90+\alpha/2)} = \frac{L_2 \sin(90+\alpha/2-\beta)}{\sin(90-\alpha/2)}.$$

However as $\sin(90-\gamma)=\sin(90+\gamma)$ then $L_1 \sin(90-\alpha/2-\beta)=L_2 \sin(90+\alpha/2-\beta)$. However, as $\sin(90-\gamma b)=\cos\gamma$ then $$L_1 \cos\left(-\frac{\alpha}{2}-\beta\right) = L_2 \cos\left(\frac{\alpha}{2}-\beta\right).$$

As $\cos(-\gamma)=\cos(\gamma)$ then $$L_1 \cos\left(\frac{\alpha}{2}+\beta\right) = L_2 \cos\left(\frac{\alpha}{2}-\beta\right).$$

If the "mirror line" is known (i.e., the "true center" of the spray distribution) then L1 L2 and $\alpha$ are known which means it is possible to solve for $\beta$.

There may be a closed form solution for $\beta$ but it is probably easier to solve for $\beta$ numerically. Once $\beta$ is known, then C1=C2 are known. With the ideal coverage, C1, known it is possible to scale L1 and L2 appropriately which should remove any skew in the distribution. However, it does not guarantee that the spray is symmetrical. To do that, it is necessary to average the data from the left and right halves of the de-skewed distribution. Scaling must be done with care as de-skewing causes $\Delta$x between the values from 0 to L1 to be different from $\Delta$x between the values from L1, to L2. In other words, one should choose a fixed $\Delta_{x\ fixed}$ (preferably, the original $\Delta$x) and then interpolate the de-skewed data as appropriate and average the interpolated, de-skewed data.

For example, consider the case where data is available at the following points: $\chi$=0.3, −0.2, −0.1, 0,0.1, and 0.2. Let's take the mirror line at 0 and assume that we discover that the left side now ranges from 0 to −0.24 and the right side also ranges from 0 to 0.24. On the left side, there are data points at −0.08, −0.16, and −0.24 and on the right side there are data points at 0.12 and 0.24. We would not be able to average these points because they are out of sync. However, using the existing data we can interpolate the intensity data at ±0.1, ±0.2, etc. This interpolated data can then be averaged, resulting in a de-skewed symmetric curve.

Mirror Line

An important consideration in the above analysis is the ability to determine L1 and L2. Preferably, the mirror line should not be fixed at the 50% spray marker, but should be located "near the center" where "near the center" is defined as those locations where at least 45% of the spray volume occurs from the mirror line to both the left and right edges of the spray (i.e., the mirror line is between 45% and 55%). For various mirror lines that are "near the center," the analysis described above is performed, a 6th order Fourier series is determined, and the average squared residual is computed. As the number of data points may change, it is preferred to use the average rather than the sum of the residuals. When computing the residuals imagine that the symmetric curve is superimposed on the original data set with the common overlap point being the mirror line. The mirror line corresponding to the lowest average residual is taken as the "correct" mirror line. Preferably, the ideal minor line is within 2% of the 50% spray marker.

Distribution vs. Parameters.

Ideally, each of the sprays should be symmetrical. In addition, a symmetrical spray will reduce the number of coefficients for a 6th harmonic Fourier series fit from 13 to 7 which will greatly simplify analysis. Therefore, each meaningful data run is processed per data cleanup recommendations. Based on this analysis, the coefficients from the optimum mirror line are determined.

Fitted Coefficients.

The first step is to determine the actual coefficients for each "cleaned-up" data run. The distribution flux at any point $\chi$ is given by $I={}_{i=0}\Sigma^{6}$ Ai cos(ix) and where x is constrained such that $-\pi<\chi<\pi$. Of course, the Fourier series distribution from $-\pi$ to $\pi$ to has to be scaled to the actual coverage which can be computed as discussed here. The coefficients A0 through A7 for each data run can be seen in the table below. Preferably, these coefficients are generated via computer executable code, such as via an AutoIT source code or as a compiled program.

Modeled Coefficients.

Each coefficient is assumed to be a independent function of the spray angle, flow rate, pressure, and spray height. The function chosen for this analysis is:

$$A_i = C_{1,i} P^{C2,i} Q^{C3,i} H^{C4,i} \tan(\alpha/2)^{C5,i} + C_{6,i}$$

where $C_{1,i}$ through $C_{6,i}$ are coefficients that must be determined for each $A_i$, P is the pressure in PSI, Q is the flow rate in GPM, H is the height in mm, and α is the spray angle. The next result in the distribution is a function of 7×6=42 coefficients.

Preferably, the coefficients $C_{1,1}$ through $C_{6,7}$ are determined (via computer executable code) such that the sum of the square of the difference between the actual $A_i$ and the model predicted $A_i$ for each data run is minimized.

The table below illustrates the determined coefficients:

| $A_i$ | $C_1$ | $C_2$ | $C_3$ | $C_4$ | $C_5$ | $C_6$ |
|---|---|---|---|---|---|---|
| $A_0$ | 0.106773 | −0.192198 | −0.00683584 | 0.893583 | −1.07605 | 0.0000819812 |
| $A_1$ | 0.0572837 | −0.319813 | −0.0710769 | 0.624046 | −1.06389 | −0.000496692 |
| $A_2$ | 0.0394276 | −1.57209 | −0.691521 | 0.276787 | −1.5898 | −0.0000887461 |
| $A_3$ | 93.0533 | −4.0033 | −1.12941 | 0.773354 | −2.62033 | 0.0000916351 |
| $A_4$ | 1.10281E+40 | −34.7519 | −1.53786 | 0.163036 | −2.87347 | −0.0000918131 |
| $A_5$ | 1.46595E+39 | −34.4753 | −2.83148 | 0.889997 | −6.02291 | 0.0000451912 |
| $A_6$ | 1.55587E+21 | −19.6041 | −2.02117 | 1.17302 | −4.90817 | −0.0000283009 |

An embodiment of the predicted CV (Coefficient of Variation) for various spray conditions and nozzle spacings using a numerical computed distribution (adjusted for actual coverage) has a good correlation to the CV computed using the raw experimental data for spray tips with nominal 65 and 80 degree spray angles.

Figure 5:
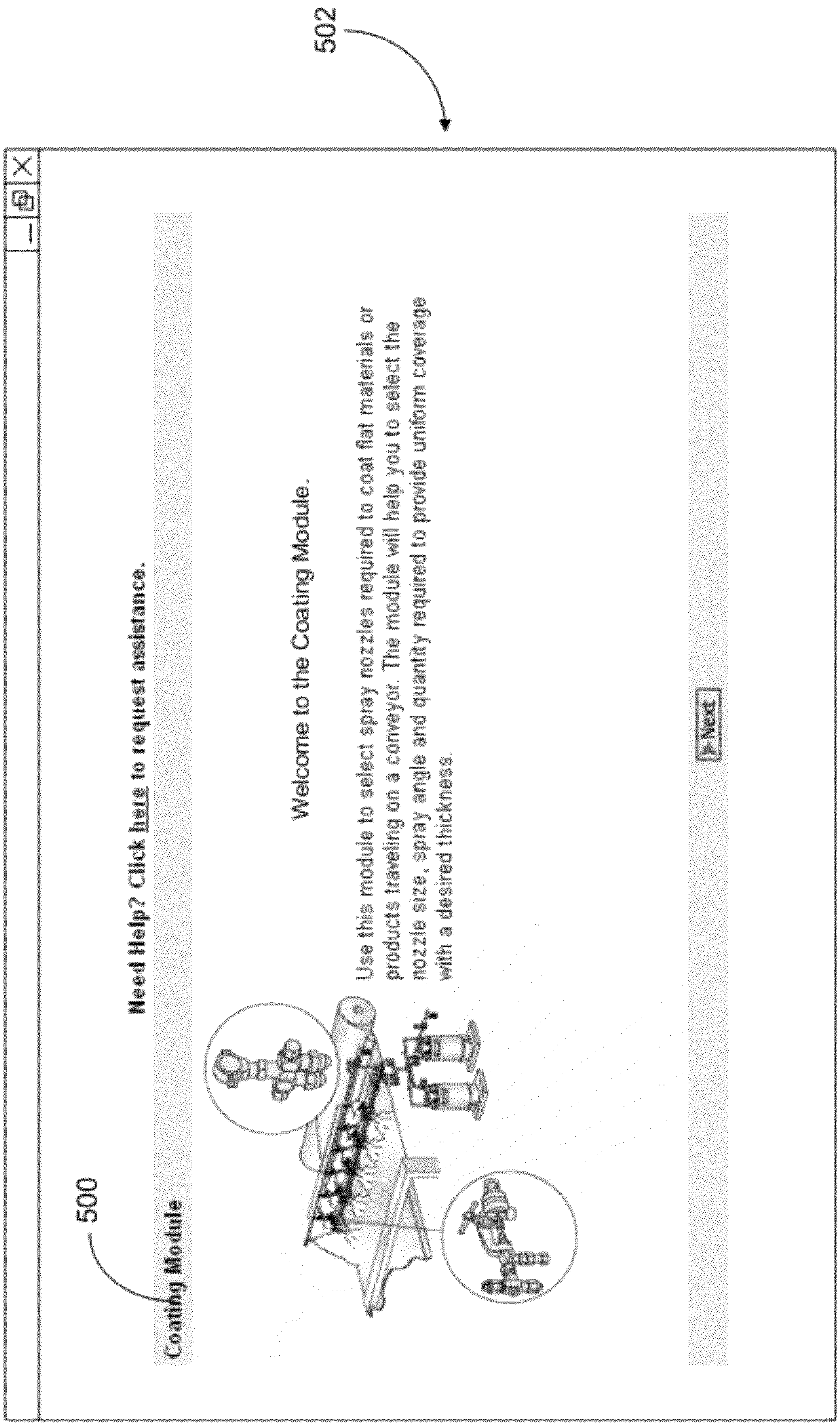
FIGS. 5-12 are schematic diagrams of a coating module of the graphical user interface (GUI) of the user input unit of FIG. 1, in accordance with an embodiment of the invention.
Figure 6:
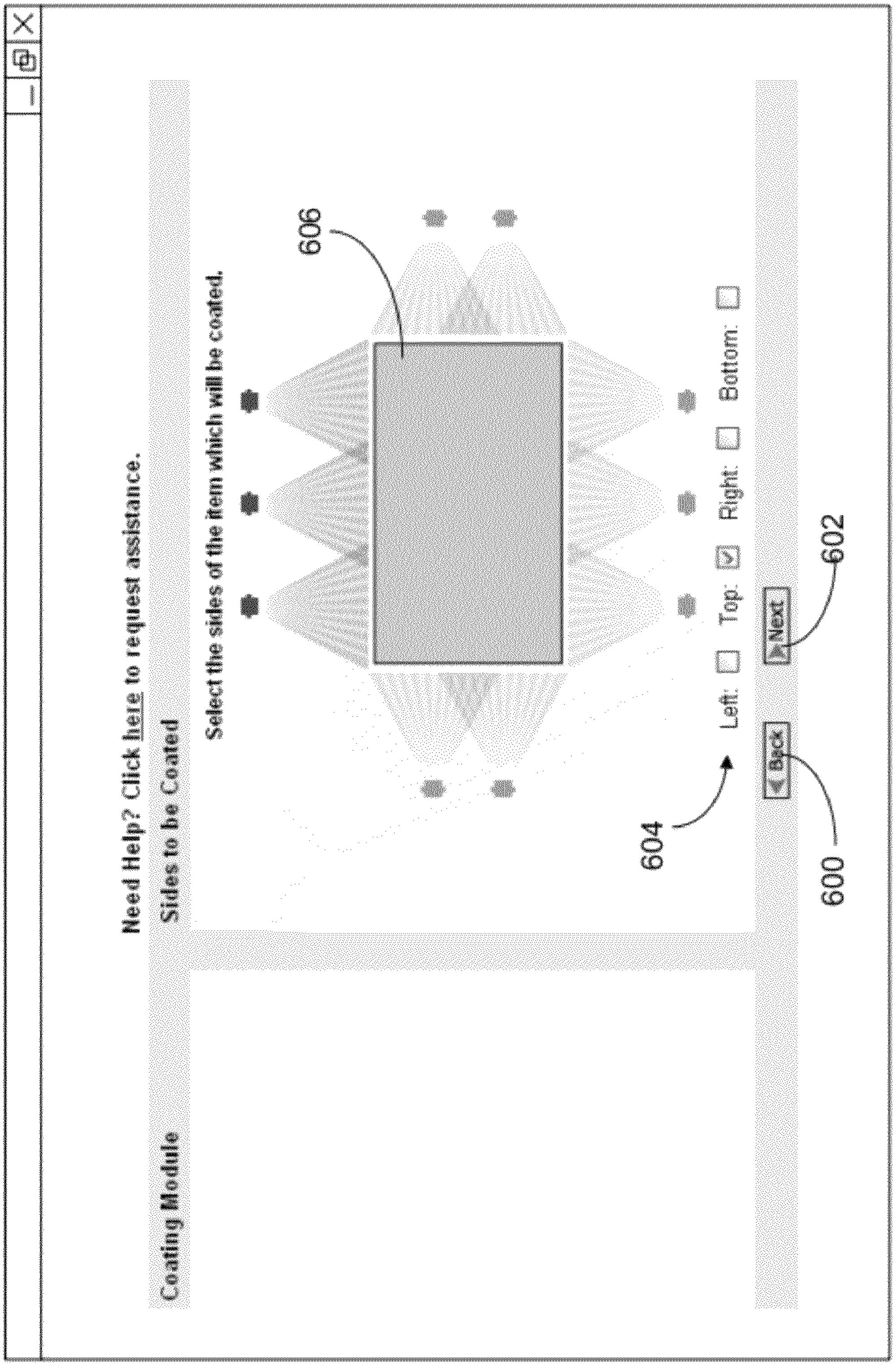
Figure 7:
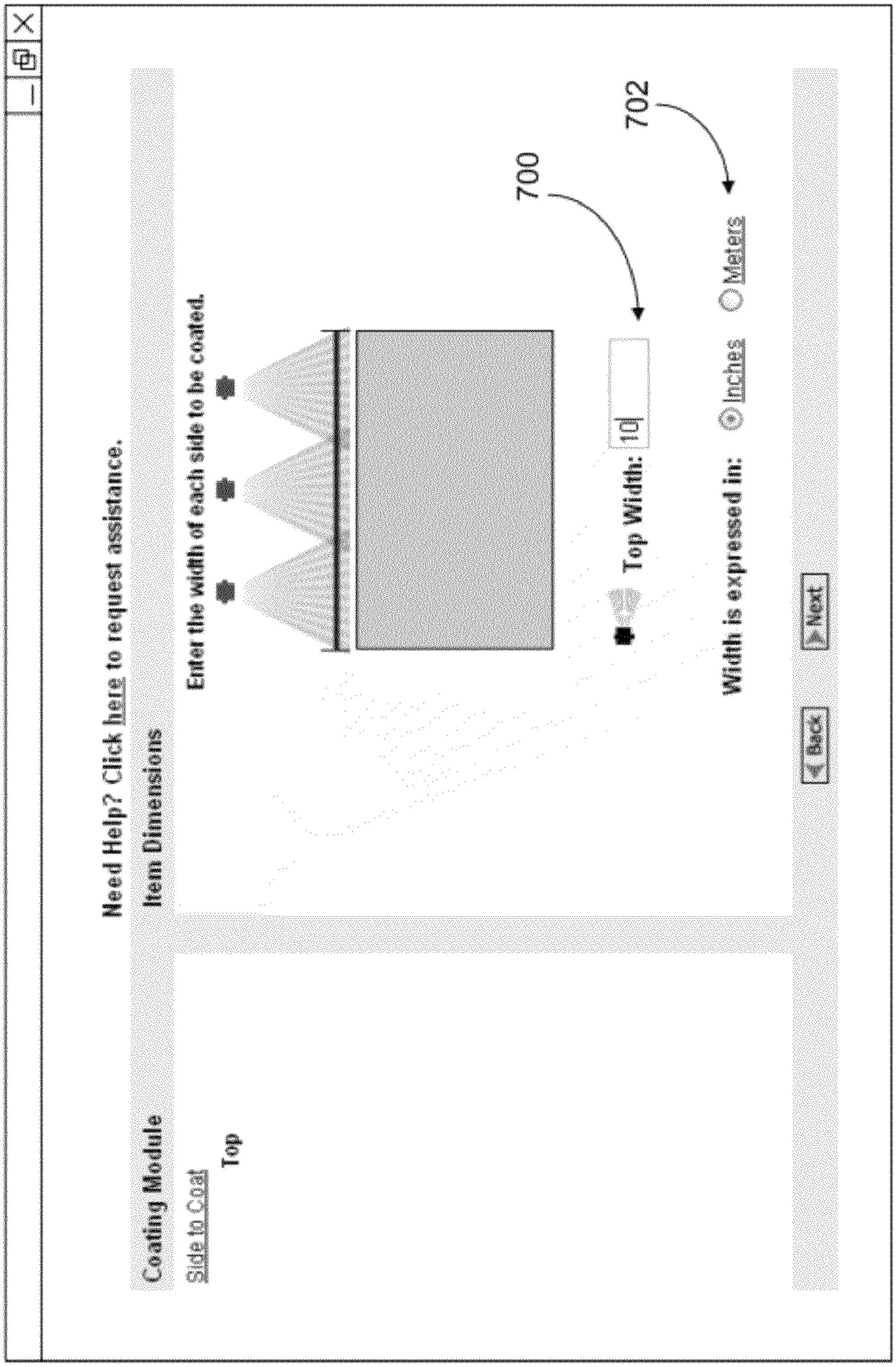
Figure 8:
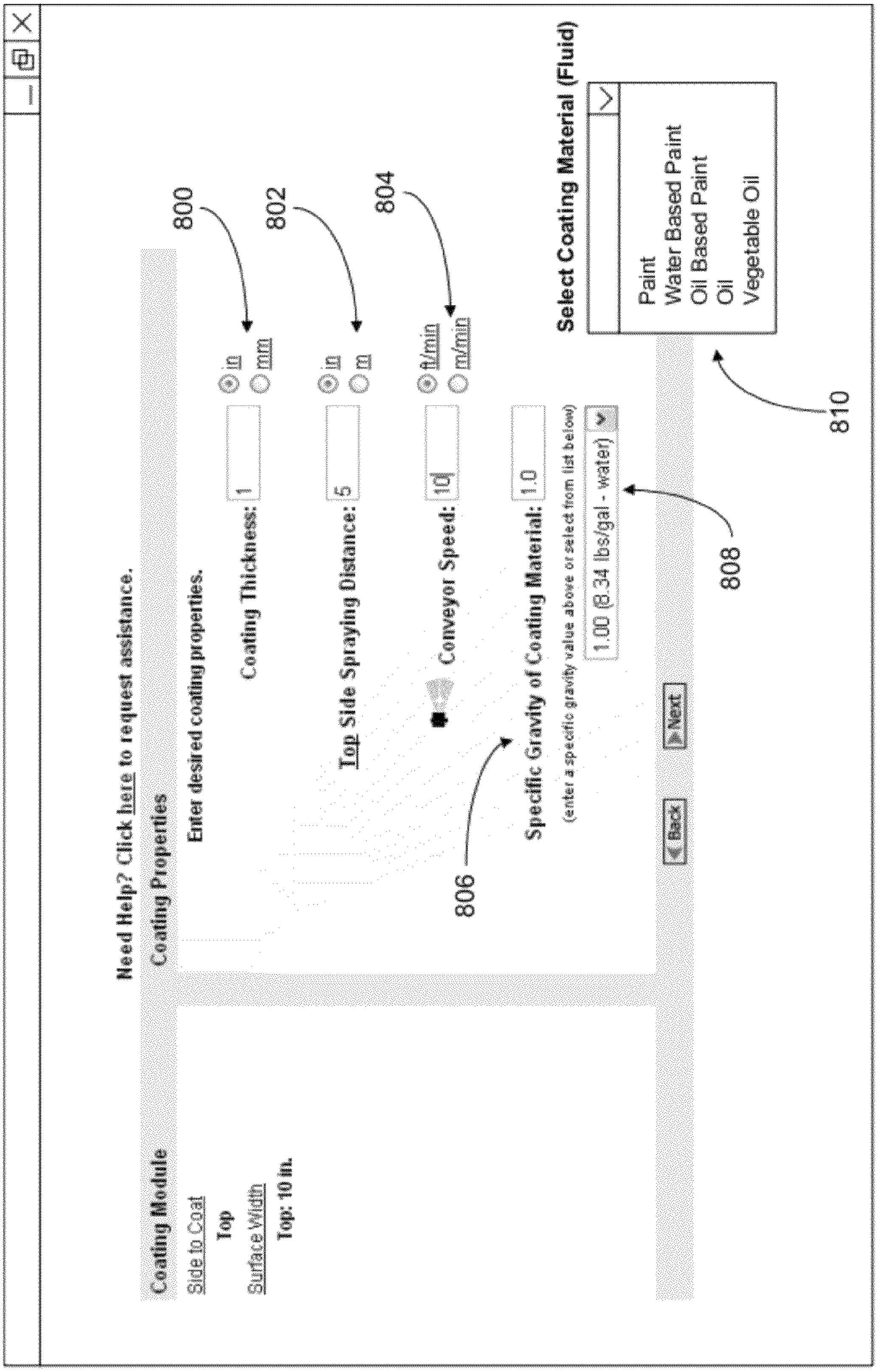

Turning to FIGS. 5-12, an embodiment of a Graphical User Interface (GUI) of the user input unit 100 for identifying a spray nozzle configuration for coating flat materials or products traveling on a conveyor is shown. In one embodiment, the user input unit 100 presents the GUI via an online interface. Alternatively or in addition, the user input unit 100 presents the GUI via a LAN. As shown in FIGS. 5 and 6, after accessing the coating module 500 via the welcome screen 502, the user is requested to input the sides of the item that require coating (i.e., top, bottom, left, and/or right sides). The user navigates between the various screens of the coating module 500 via “Back” and “Next” navigation buttons 600, 602. In FIG. 6, when the user selects one or more sides for coating via selection buttons 604, the coating module 500 graphically represents the item 606 to be coated by highlighting the selected side(s). Proceeding to FIG. 7, the user inputs the width 700 of the selected side(s) of the item to be coated and specifies the units of width via radio buttons 702. In FIG. 8, the user specifies the desired coating properties, such as the coating thickness 800, spraying distance 802 to each of the selected sides of the item to be coated, and conveyor speed 804. Additionally, the user specifies specific gravity 806 of the coating material, either directly or via drop down list 808. Alternatively or in addition, the user also specifies the type of coating fluid via a drop down list 810 (e.g., paint, water based paint, oil based paint, oil, vegetable oil, among others). User selection of the type of coating fluid allows the fluid performance matching unit 104 to approximate or match the fluid properties, such as viscosity and surface tension, of the selected fluid to those of the nozzle test data in the spray nozzle database 202. Since the spray angle changes due to different viscosity and surface tension of coating materials, selection of a fluid category from the drop down list 810 allows the fluid performance matching unit 104 to more closely match the likely spray performance of the specified system and results in a more accurate nozzle configuration suggestion for the user. More specific selections of the coating fluid (e.g., “water based paint” is more specific than “paint” in general) results in a better match of viscosity and surface tension characteristics, thereby producing a more accurate nozzle configuration for the user. In another embodiment, the user directly inputs viscosity and surface tension parameters of the fluid (if known) for further processing.

Figure 9:
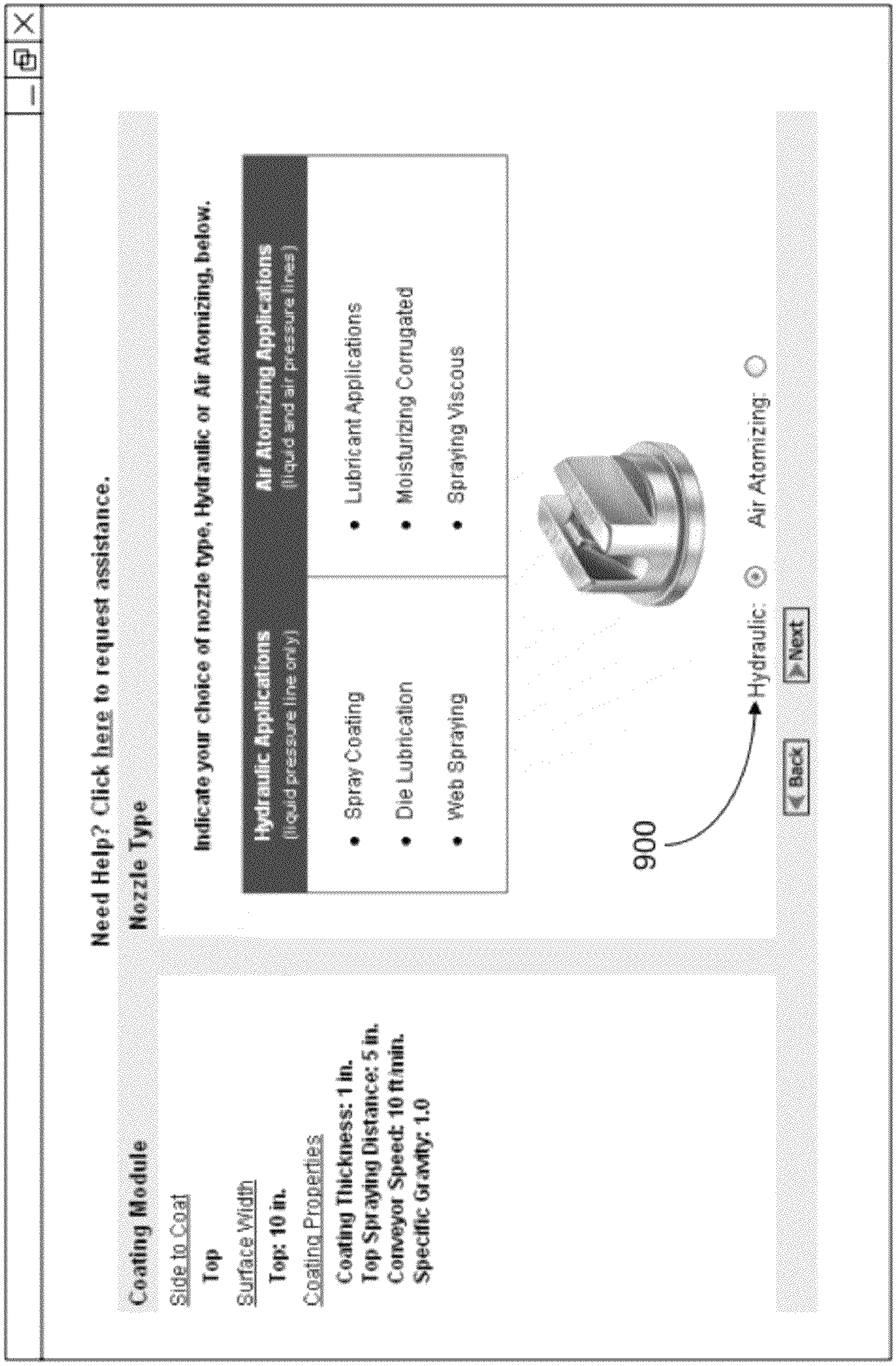
Figure 10:
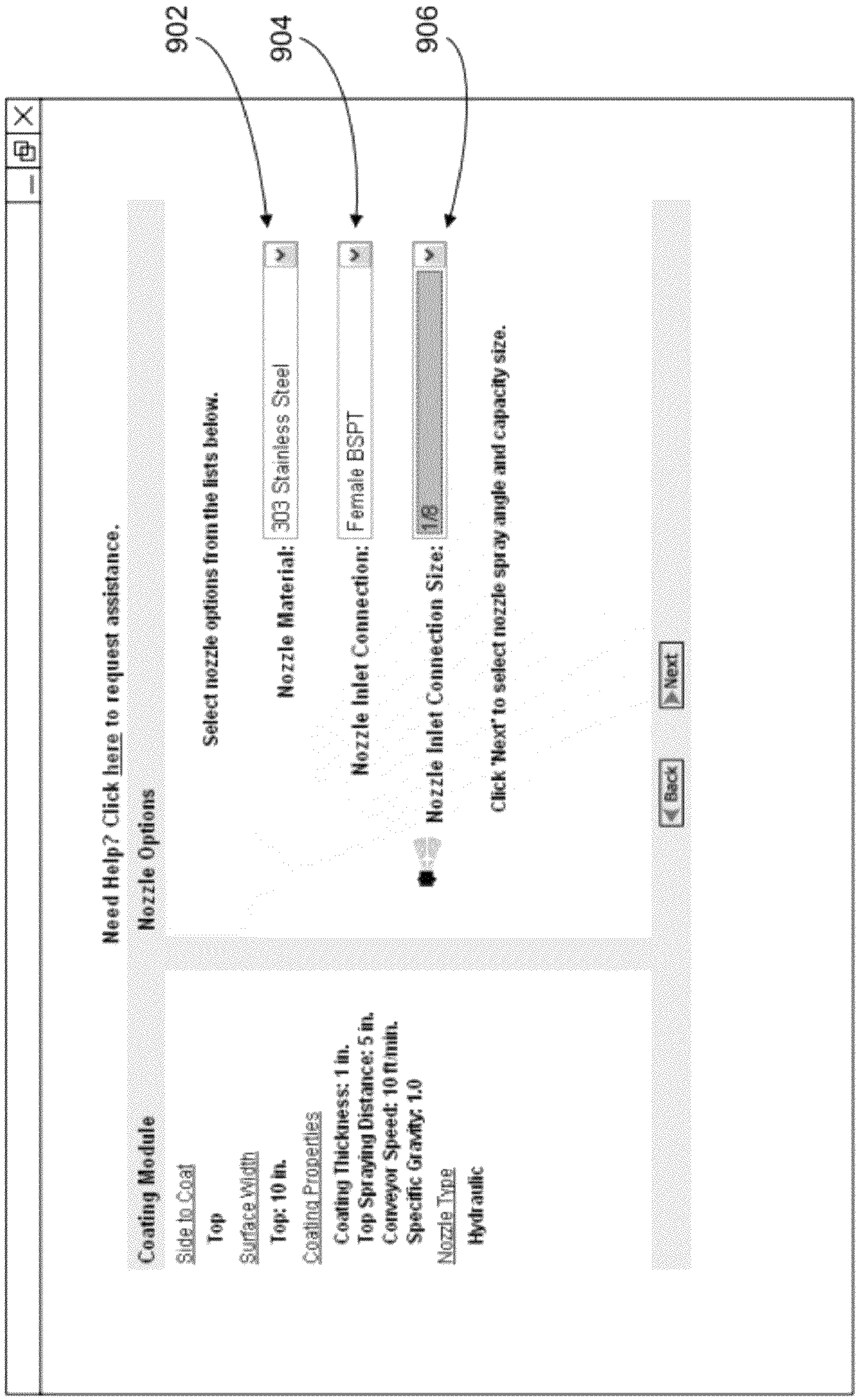
Figure 11:
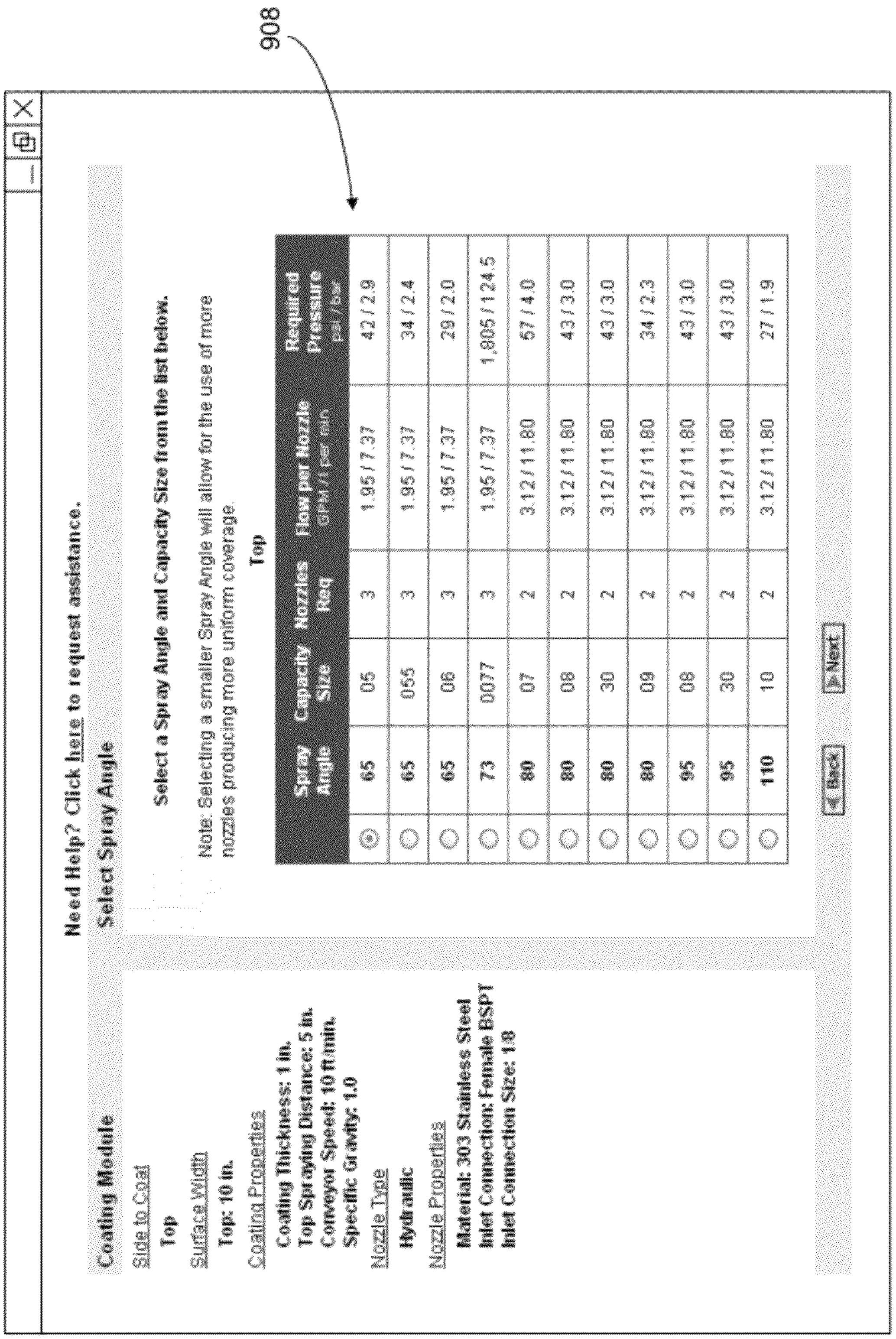
Figure 12:
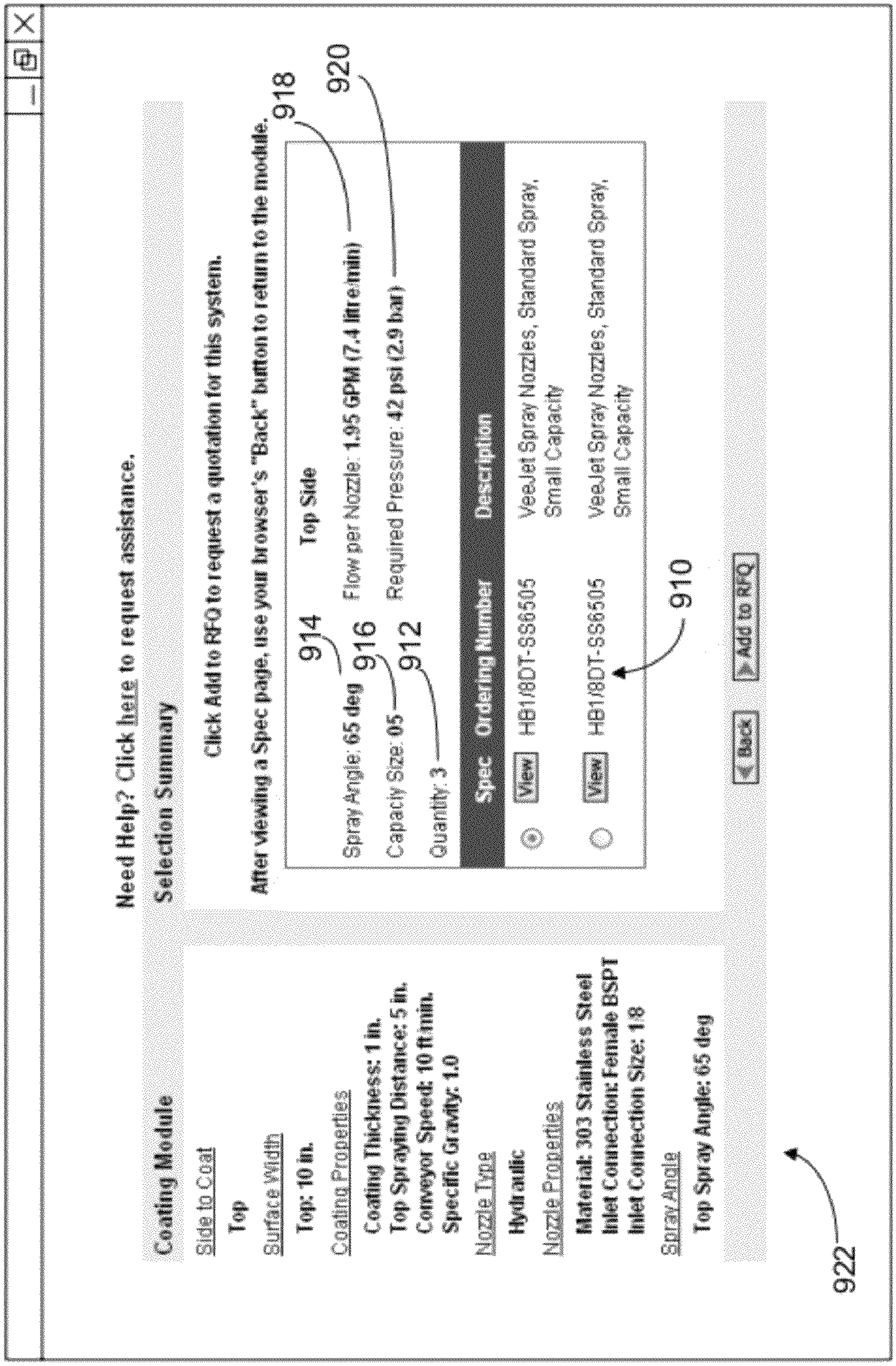

In FIG. 9, the user selects the desired nozzle type 900 (e.g., for hydraulic or air atomizing applications), which further narrows the universe of available nozzles. Additional nozzle properties, such as nozzle material 902 (e.g., stainless steel), nozzle inlet connection type 904 (e.g., female BSPT), and nozzle inlet connection size 906 are selected in FIG. 10. In FIG. 11, upon receiving the foregoing input, the fluid performance matching module 104 matches the viscosity and/or surface tension of the desired coating fluid (when coating material is selected), as well as the other system parameters, to the collected data in the spray nozzle database, determines the flow rate (e.g., in gpm) per given required pressure (e.g., in psi) corresponding to a number of spray angles and requests the user to select the desired spray angle for each side of the item selected for coating. Preferably, the user is presented with a list of spray angles, corresponding nozzle capacity sizes and required number of nozzles, and flow/pressure specifications for each side selected for coating, as shown in FIG. 11. Smaller spray angle selection by the user requires more nozzles, but results in a more uniform coverage of the item to be coated. Finally, in FIG. 12, the user coating module 500 presents the user with suggested nozzle types 910, nozzle quantity 912, spray angle 914, nozzle capacity 916, as well as corresponding flow rate 918 and pressure 920 specifications. Preferably, the coating module 500 also presents the user with a system summary report 922 containing the selected system parameters.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of supplying a spray system configuration for a user application, the method comprising:

receiving, via at least one computer executing computer readable instructions stored on a tangible computer-readable medium, a set of application parameters including an application geometry and a fluid identification for the spray system;

converting the received fluid identification to an estimated fluid parameter set using the at least one computer, wherein the estimated fluid parameter set includes one or more parameters that at least approximate physical characteristics of the fluid corresponding to the fluid identification;

based on the application geometry and the estimated fluid parameter set, specifying using the at least one computer, a solution geometry and a solution parameter set, wherein the solution geometry comprises a specified number and type of spray nozzles in a specified orientation relative to the application geometry and the solution parameter set includes at least a fluid pressure at which the fluid is supplied to the spray nozzles; and providing the solution geometry to the user.

2. The method of claim 1 wherein the application geometry includes constraints for nozzle position and an application requirement for coating of an item with the fluid.

3. The method of claim 2 wherein the application geometry further comprises conveyor speed.

4. The method of claim 1 further comprising receiving the set of application parameters via a graphical user interface.

5. The method of claim 4 wherein the graphical user interface collects user input of the fluid identification, the fluid identification originating from a predetermined list of fluids.

6. The method of claim 1 wherein the estimated fluid parameter set comprises an estimated viscosity and an estimated surface tension.

7. The method of claim 1 wherein the estimated solution parameter set further comprises a flow rate corresponding to the fluid pressure.

8. A non-transitory computer readable medium having stored thereon computer executable instructions for supplying a spray system configuration for a user application, the medium comprising instructions for:

receiving a set of application parameters including an application geometry and a fluid identification for the spray system;

converting the received fluid identification to an estimated fluid parameter set, wherein the estimated fluid parameter set includes one or more parameters that at least approximate physical characteristics of the fluid corresponding to the fluid identification;

based on the application geometry and the estimated fluid parameter set, specifying a solution geometry and a solution parameter set, wherein the solution geometry comprises a specified number and type of spray nozzles in a specified orientation relative to the application geometry and the solution parameter set includes at least a fluid pressure at which the fluid is supplied to the spray nozzles; and providing the solution geometry to the user.

9. The computer readable medium of claim 8 wherein the application geometry includes constraints for nozzle position and an application requirement for coating of an item with the fluid.

10. The computer readable medium of claim 9 wherein the application geometry further comprises conveyor speed.

11. The computer readable medium of claim 8 wherein the medium further comprises instructions for receiving the set of application parameters via a graphical user interface.

12. The computer readable medium of claim 11 wherein the graphical user interface collects user input of the fluid identification, the fluid identification originating from a predetermined list of fluids.

13. The computer readable medium of claim 8 wherein the estimated fluid parameter set comprises an estimated viscosity and an estimated surface tension.

14. The computer readable medium of claim 8 wherein the estimated solution parameter set further comprises a flow rate corresponding to the fluid pressure.

* * * * *